United States Patent
Lee et al.

(10) Patent No.: US 9,947,285 B2
(45) Date of Patent: Apr. 17, 2018

(54) VOLTAGE CONVERTER AND DISPLAY DEVICE INCLUDING THE SAME

(71) Applicant: Samsung Display Co., Ltd., Yongin, Gyeonggi-Do (KR)

(72) Inventors: Gwang-Teak Lee, Cheonan-si (KR); Seung-Young Choi, Yongin-si (KR); Jae-Kyu Park, Cheonan-si (KR)

(73) Assignee: Samsung Display Co., Ltd., Yongin (KR)

( * ) Notice: Subject to any disclaimer, the term of this patent is extended or adjusted under 35 U.S.C. 154(b) by 471 days.

(21) Appl. No.: 14/616,887

(22) Filed: Feb. 9, 2015

(65) Prior Publication Data

US 2016/0063942 A1    Mar. 3, 2016

(30) Foreign Application Priority Data

Aug. 29, 2014    (KR) .................. 10-2014-0114337

(51) Int. Cl.
*H05B 37/02* (2006.01)
*G09G 3/36* (2006.01)
(Continued)

(52) U.S. Cl.
CPC ......... *G09G 3/3696* (2013.01); *G09G 3/3648* (2013.01); *H02M 3/158* (2013.01); *H02M 3/1588* (2013.01); *G09G 3/3406* (2013.01); *G09G 2310/08* (2013.01); *G09G 2330/024* (2013.01); *G09G 2330/028* (2013.01);
(Continued)

(58) Field of Classification Search
None
See application file for complete search history.

(56) References Cited

U.S. PATENT DOCUMENTS

2003/0169214 A1*  9/2003  Kigo .................... G09G 3/2022
                                                                    345/60
2008/0224628 A1*  9/2008  Agarwal ............ H05B 41/2806
                                                                    315/246
(Continued)

FOREIGN PATENT DOCUMENTS

KR    10-2010-0069581 A    6/2010
KR    10-1134462 B1        4/2012
KR    10-2012-0048154 A    5/2012

*Primary Examiner* — Jennifer Mehmood
*Assistant Examiner* — Carl Adams
(74) *Attorney, Agent, or Firm* — H.C. Park & Associates, PLC

(57) ABSTRACT

A voltage converter includes a conversion unit, a self driver and an output unit. The conversion unit includes at least one inductor and provides a boosting power based on an input voltage and a first driving signal. The self driver includes at least one inductor that forms a magnetic coupling with the at least one inductor of the conversion unit. The self driver generates a second driving signal that is synchronized with the first driving signal through the magnetic coupling. The output unit generates an output voltage based on the boosting power and the second driving signal. Switching loss and conduction loss may be reduced by replacing an output diode with an output transistor and voltage spike and electromagnetic interference may be reduced through zero voltage switching. The driving signal of the output transistor may be controlled efficiently by adjusting the inductance of the driving inductor.

20 Claims, 9 Drawing Sheets

(51) Int. Cl.
*H02M 3/158* (2006.01)
*H02M 1/00* (2006.01)
*G09G 3/34* (2006.01)

(52) U.S. Cl.
CPC .. *H02M 2001/0048* (2013.01); *Y02B 70/1466* (2013.01); *Y02B 70/1491* (2013.01)

(56) References Cited

U.S. PATENT DOCUMENTS

| | | | | |
|---|---|---|---|---|
| 2009/0257254 | A1* | 10/2009 | Leu | H02M 1/34 363/40 |
| 2012/0063172 | A1 | 3/2012 | Kim et al. | |
| 2012/0293152 | A1* | 11/2012 | Gao | H02M 3/156 323/311 |
| 2013/0002162 | A1* | 1/2013 | Gao | H05B 33/0815 315/210 |
| 2013/0002639 | A1* | 1/2013 | Park | G09G 3/3225 345/212 |

* cited by examiner

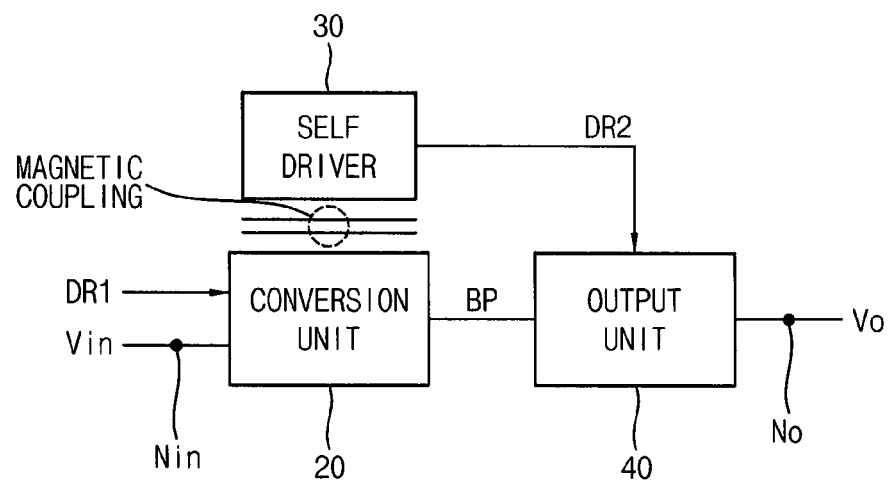
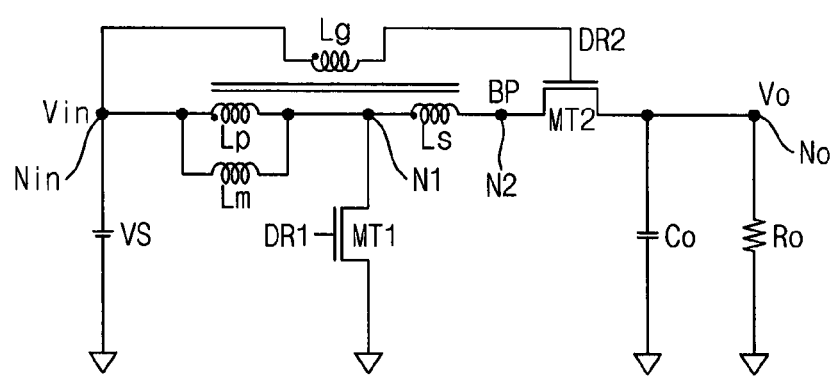
FIG. 2

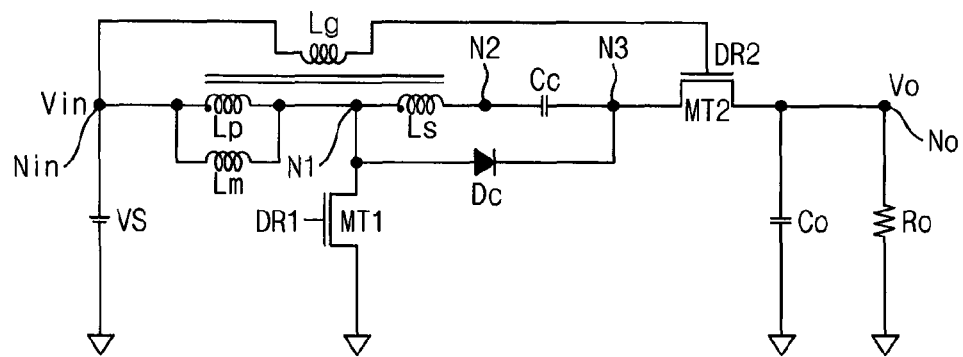
FIG. 12
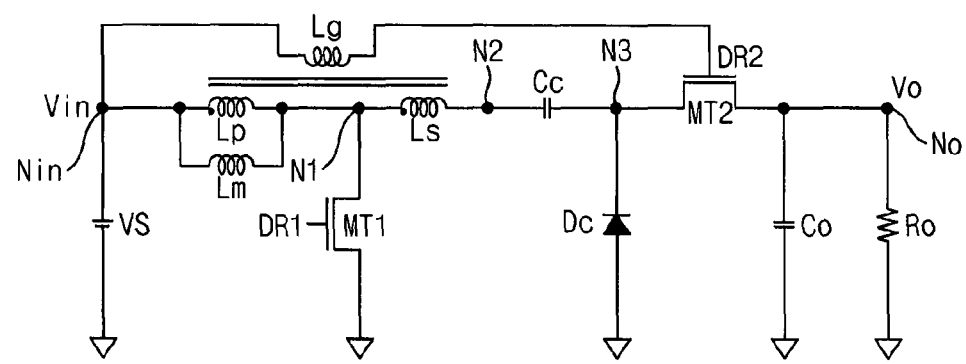

VOLTAGE CONVERTER AND DISPLAY DEVICE INCLUDING THE SAME

CLAIM OF PRIORITY

This application makes reference to, incorporates the same herein, and claims all benefits accruing under 35 U.S.C § 119 from an application earlier filed in the Korean Intellectual Property Office on the 29 of Aug. 2014 and there duly assigned Serial No. 10-2014-0114337.

BACKGROUND OF THE INVENTION

Field of the Invention

Example embodiments of the inventive concept relate to power supply, and more particularly to a voltage converter and a display device including the voltage converter.

Description of the Related Art

A typical power supply device may rectify an AC voltage to provide a DC voltage or boost a DC voltage to provide another DC voltage of a different voltage level. The power supply device may include various voltage converters such as a buck converter, a boost converter, a single-ended primary inductance converter (SEPIC), etc.

An ideal voltage converter may have wider input and output voltage ranges, easier control and lower power loss. The switching mode voltage converter such as the boost converter may reduce its size and increase a response speed of an output voltage and thus a switching frequency may be increased easily. However, power loss increases as the switching frequency increases.

For example, if a power switch of the switching mode voltage converter is turned on according to the switching frequency, switching loss may be caused due to hard switching that a current flows through a power switch. In addition, excessive voltage spike may occur at a drain electrode of the power switch in case of the hard switching. A loss snubber may be adopted to reduce the surge current by the voltage spike. However the loss snubber increases size and manufacturing cost of a voltage converter and a device including the voltage converter.

SUMMARY OF THE INVENTION

At least one example embodiment of the inventive concept provides a voltage converter capable of reducing power loss without a loss snubber.

At least one example embodiment of the inventive concept provides a display device including a voltage converter capable of reducing power loss without a loss snubber.

According to example embodiments, a voltage converter includes a conversion unit, a self driver and an output unit. The conversion unit includes at least one inductor and provides a boosting power based on an input voltage and a first driving signal. The self driver includes at least one inductor that forms a magnetic coupling with the at least one inductor of the conversion unit. The self driver generates a second driving signal that is synchronized with the first driving signal through the magnetic coupling. The output unit generates an output voltage based on the boosting power and the second driving signal.

In an example embodiment, the conversion unit may include a primary inductor connected between an input node receiving the input voltage and a first node, a secondary inductor connected between the first node and a second node providing the boosting power, and a first transistor connected between the first node and a ground voltage, a gate electrode of the first transistor receiving the first driving signal.

In an example embodiment, the self driver may include a driving inductor forming the magnetic coupling with at least one of the primary inductor and the secondary inductor to generate the second driving signal that is synchronized with the first driving signal.

In an example embodiment, the driving inductor may include a variable inductor to control transition timings of the second driving signal by adjusting an inductance of the variable inductor.

In an example embodiment, the driving inductor may be electrically coupled to the input node.

In an example embodiment, the output unit may include a second transistor connected between the second node and an output node providing the output voltage, a gate electrode of the second transistor receiving the second driving signal.

In an example embodiment, the output unit may further include an output capacitor connected between the output node and the ground voltage.

In an example embodiment, the conversion unit may include a primary inductor connected between an input node receiving the input voltage and a first node, a secondary inductor connected between the first node and a second node, a first transistor connected between the first node and a ground voltage, a gate electrode of the first transistor receiving the first driving signal, a coupling capacitor connected between the second node and a third node providing the boosting power and a clamp diode connected to the third node.

In an example embodiment, an anode of the clamp diode may be connected to the input node and a cathode of the clamp diode is connected to the third node.

In an example embodiment, the self driver may include a driving inductor forming the magnetic coupling with at least one of the primary inductor and the secondary inductor to generate the second driving signal that is synchronized with the first driving signal, the driving inductor connected to the cathode of the clamp diode.

In an example embodiment, an anode of the clamp diode may be connected to the first node and a cathode of the clamp diode may be connected to the third node.

In an example embodiment, an anode of the clamp diode may be connected to the ground voltage and a cathode of the clamp diode is connected to the third node.

In an example embodiment, the output unit may include a second transistor connected between the third node and an output node providing the output voltage, a gate electrode of the second transistor receiving the second driving signal and an output capacitor connected between the output node and the ground voltage.

In an example embodiment, the input voltage and the output voltage may be DC voltages.

According to example embodiments, a voltage converter includes a primary inductor connected between an input node receiving an input voltage and a first node, a secondary inductor connected between the first node and a second node, a first transistor connected between the first node and a ground voltage, a gate electrode of the first transistor receiving the first driving signal, a driving inductor forming a magnetic coupling with at least one of the primary inductor and the secondary inductor to generate a second driving signal that is synchronized with the first driving signal, a second transistor connected between the second node and an output node providing an output voltage, a gate electrode of the second transistor receiving the second driving signal and an output capacitor connected between the output node and the ground voltage.

In an example embodiment, the second transistor may be turned on before the first transistor is turned on to generate a reverse current flowing from the output node to the second node.

In an example embodiment, a zero voltage switching may be performed such that the first transistor is turned on after a voltage on the first node becomes a zero voltage.

According to example embodiments, a display device includes a display panel including a plurality of pixels forming a plurality of row and a plurality of columns, a driver configured to drive the pixels in the display panel and a voltage converter configured to boost an input voltage to provide an output voltage. The voltage converter includes a conversion unit including at least one inductor, the conversion unit configured to provide a boosting power based on the input voltage and a first driving signal, a self driver including at least one inductor that forms a magnetic coupling with the at least one inductor of the conversion unit, the self driver configured to generate a second driving signal that is synchronized with the first driving signal through the magnetic coupling and an output unit configured to generate the output voltage based on the boosting power and the second driving signal.

In an example embodiment, the output voltage generated by the voltage converter may be provided to the display panel.

In an example embodiment, the display device may further include a back light unit configured to emit lights to the display panel, and the output voltage generated by the voltage converter may be provided to the back light unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 1 is a block diagram illustrating a voltage converter according to example embodiments;

FIG. 2 is a circuit diagram illustrating a voltage converter according to an example embodiment;

FIGS. 9, 10, 11 and 12 are circuit diagrams illustrating voltage converters according to example embodiments;

DETAILED DESCRIPTION OF THE INVENTION

Figure 3:
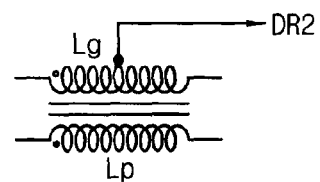
FIG. 3 is a diagram illustrating an example of magnetic coupling of a driving inductor and control of inductance.

The example embodiments are described more fully hereinafter with reference to the accompanying drawings. Like or similar reference numerals refer to like or similar elements throughout.

Although terms such as first, second, third, etc., may be used to describe diverse constituent elements, such constituent elements are not limited by the terms. The terms are used only to discriminate a constituent element from other similar constituent elements in the specification. The claims may not use the same terms, but instead may use the terms first, second, third, etc. with respect to the order in which an element is claimed. Accordingly, in the following description, a first constituent element may be a second constituent element in a claim.

FIG. 1 is a block diagram illustrating a voltage converter according to example embodiments.

Referring to FIG. 1, a voltage converter 10 includes a conversion unit 20, a self driver 30 and an output unit 40.

The conversion unit 20 includes at least one inductor and provides a boosting power BP based on an input voltage Vin at an input node Nin and a first driving signal DR1. The self driver 30 includes at least one inductor that forms a magnetic coupling with the at least one inductor of the conversion unit 20. The self driver 30 generates a second driving signal DR2 that is synchronized with the first driving signal DR1 through the magnetic coupling. The output unit 40 generates an output voltage Vo an output node No based on the boosting power BP and the second driving signal DR2.

Hereinafter, a basic configuration of the voltage converter 10 is described with reference to FIG. 2 and a basic operation of the voltage converter 10 is described with reference to FIG. 4. The voltage converter 10 according to example embodiments may be an inductor-coupled boost converter as illustrated in FIGS. 2, 9, 10, 11 and 12. The input voltage Vin and the output voltage Vo may be DC voltages.

FIG. 2 is a circuit diagram illustrating a voltage converter according to an example embodiment.

Referring to FIG. 2, a voltage converter 11 may include a primary inductor Lp, a secondary inductor Ls, a first transistor MT1, a driving inductor Lg, a second transistor MT2 and an output capacitor Co. A voltage source VS and a load Ro are illustrated further in FIG. 2 for convenience of description. The voltage source VS may be a static voltage source such as a battery, and the load Ro represents a load of a device that is powered by the output voltage Vo.

The primary inductor Lp, the secondary inductor Ls and the first transistor MT1 correspond to the conversion unit 20 of FIG. 1. The primary inductor Lp is connected between the input node Nin receiving input voltage Vin and a first node N1. The secondary inductor Ls is connected between the first node N1 and a second node N2 providing a boosting power BP. The first transistor MT1 is connected between the first node N1 and a ground voltage, and a gate electrode of the first transistor MT1 receives the first driving signal DR1.

The first transistor MT1 is switched in response to the first driving signal DR1 that may be provided from an external driver to control current flows of the conversion unit 20. The first driving signal may be a pulse width modulation (PWM) signal that is controlled to have a desired duty ratio. The circuits for generating the first driving signal DR1 may be included in the voltage converter 11 or disposed outside the voltage converter 11.

The first transistor MT1 includes a gate electrode receiving the first driving signal DR1, a drain electrode connected to the first node N1 and a source electrode connected to a ground voltage. The first transistor MT1 may be a field effect transistor (FET) such as a metal-oxide semiconductor (MOS) transistor, or an insulated gate bipolar transistor (IGBT). For example, the first transistor MT1 may be an N-channel MOS transistor. In some example embodiments, the first transistor MT1 may be substitute with a switching element of another type such as an integrated gate commutated thyristor (IGCT).

The primary inductor Lp and the secondary inductor Ls form a magnetic coupling according to a mutual inductance between them. Also the primary inductor Lp and the secondary inductor Ls are electrically connected through the first node N1. A magnetization inductance component Lm in parallel with the primary inductor Lp is represented in FIG. 2. Even though not illustrated in FIG. 2, also a leakage inductance component may be formed in series with the primary inductor Lp toward the direction of the input voltage Vin. In some example embodiments, the primary inductor Lp and the secondary inductor Ls may be implemented with a tapped inductor.

The operations of the conversion unit 20, that is, the assembly of the primary inductor Lp, the secondary inductor Ls and the first transistor MT1, may be divided into an operation when the first transistor MT1 is turned on and an operation when the first transistor MT1 is turned off. Energy is accumulated in the primary inductor Lp and the secondary inductor Ls when the first transistor MT1 is turned on. An induced voltage by the accumulated energy is added to the input voltage Vin and the boosted power BP is applied to the second node N2 when the first transistor MT1 is turned off.

The driving inductor Lg corresponds to the self driver 30 of FIG. 1. The driving inductor Lg forms a magnetic coupling with at least one of the primary inductor Lp and the secondary inductor Ls to generate the second driving signal DR2 that is synchronized with the first driving signal DR1. The synchronization of the first driving signal DR1 and the second driving signal DR2 is described with reference to FIG. 4. In some example embodiments, the driving inductor Lg may be electrically coupled to the input node Nin to which the input voltage Vin is applied.

The second transistor MT2 and the output capacitor Co correspond to the output unit 40 of FIG. 1. The second transistor MT2 is connected between the second node N2 and the output node No providing the output voltage Vo. A gate electrode of the second transistor MT2 receives the second driving signal DR2. The output capacitor Co is connected between the output node No and the ground voltage.

The second transistor MT2 is switched in response to the second driving signal DR2 that is provided from the driving inductor Lg to control a current flow between the second node N2 and the output node No. The second driving signal DR2 is synchronized with the first driving signal DR1 through the magnetic coupling between the driving inductor Lg and at least one of the primary and secondary inductors Lp and Ls. The boosting power BP may be provided through the second node N2 in a form of a current or a voltage. The second driving signal DR2 is synchronized with the first driving signal DR1 such that the second transistor MT2 is turned off when the first transistor MT1 is turned on and the energy is accumulated in the primary and secondary inductors Lp and Ls, and the second transistor MT2 is turned on when the first transistor MT1 is turned off and the boosting power BP is provided through the second node N2. The synchronization of the first and second driving signals DR1 and DR2 is further described with reference to FIG. 4. The second transistor MT2 may be a FET such as a MOS transistor, or an IGBT. For example, the second transistor MT2 may be an N-channel MOS transistor. The output capacitor Co stores and stabilizes the output voltage Vo. In some example embodiments, the output capacitor Co together with the load Ro may be included in an external device such as a display device.

FIG. 3 is a diagram illustrating an example of magnetic coupling of a driving inductor and control of inductance.

Even though a magnetic coupling between the driving inductor Lg and the primary inductor Lp is illustrated in FIG. 3, the driving inductor Lg may form a magnetic coupling with the secondary inductor Ls or simultaneously with the primary inductor Lp and the secondary inductor Ls.

In some example embodiments, the driving inductor Lg may be implemented with a variable inductor. In this case, transition timings of the second driving signal DR2 may be controlled by adjusting an inductance of the variable driving inductor Lg. The mutual inductance between the driving inductor Lg and the primary inductor Lp may be changed by changing the self inductance of the variable driving inductor Lg. A current depending on the first driving signal DR1 flows in the primary inductor Lp and an induced current, which depends on the mutual inductance and the current change of the main inductor Lp, is caused in the driving inductor Lg. The transition timings of the second driving signal DR2 is determined according to the induced current in the driving inductor Lg. Accordingly the transition timings of the second driving signal DR2 may be controlled by adjusting the inductance of the driving inductor Lg.

The inductance is the property of a conductor by which a change in current flowing through the conductor induces or creates a voltage in the conductor itself (self-inductance) and in any nearby conductors (mutual inductance). In case of a coil inductor, the inductance increases as the turn number of the coil increases and/or the current change in the coil increases. For example, the variable inductor may be implemented in a form of changing a position of a tap along the coil as illustrated in FIG. 3. The variable inductor may be implemented in various forms, for example, of changing relative positions of coils, of controlling electrical connections of coils, etc.

Figure 4:
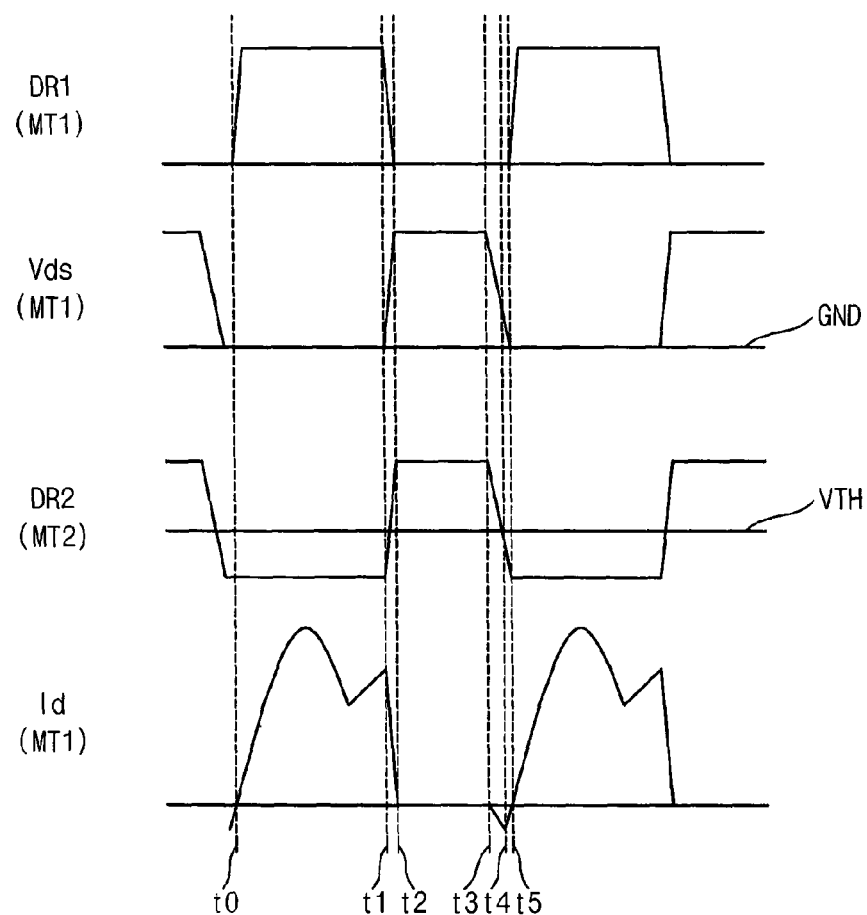
FIG. 4 is a timing diagram illustrating operations of a voltage converter according to example embodiments.

FIG. 4 is a timing diagram illustrating operations of a voltage converter according to example embodiments.

Referring to FIGS. 2 and 4, the first driving signal DR1 applied to the gate electrode of the first transistor MT1 may be a pulse width modulation (PWM) signal that is controlled to have a desired duty ratio. When the first driving signal DR1 is activated in logic high level and the first transistor MT1 is turned on, energy is accumulated in the primary inductor Lp and the secondary inductor Ls. At this time, the voltage of the first node N1, that is, the drain-source voltage Vds of the first transistor MT1 becomes the ground voltage GND and the drain current Id is caused in the first transistor MT1 according to the operational characteristics of the voltage converter 11. When the first driving signal DR1 is deactivated in the logic low level and the first transistor MT1 is turned off, an induced voltage by the accumulated energy is added to the input voltage Vin and the boosted voltage is applied to the second node N2. At this time, the drain-source voltage Vds of the first transistor MT1 becomes the boosted voltage and the drain current Id becomes zero.

The second driving signal DR2 applied to the gate electrode of the second transistor MT2 is synchronized complementarily with the first driving signal DR1. The second driving signal DR2 transitions from logic high level to logic low level when the first driving signal DR1 transitions from logic low level to logic high level, and the second driving signal DR2 transitions from logic low level to logic high level when the first driving signal DR1 transitions from logic high level to logic low level. As a result, the second transistor MT2 is turned off to block a reverse current from the output node No to the second node N2 when the first transistor MT1 is turned on and the energy is accumulated in the primary inductor Lp and the secondary inductor Ls. In contrast, the second transistor MT2 is turned on to transfer the boosting power BP from the second node N2 to the output node No when the first transistor MT1 is turned off and the boosting power BP is provided.

The reverse current by the reverse bias may be prevented fundamentally if an output diode is adopted. If the output diode is replaced with the second transistor MT2, the reverse current may be caused while the second driving signal DR2 transitions from logic low level to logic high level, and zero voltage switching may be realized using such reverse current. During the time interval between t3 and t4, the level of the second driving signal DR2 is higher than a threshold voltage of the second transistor MT2 and thus the reverse current flowing from the output node No to the second node N2 may be caused. During the time interval between t4 and t5, the reverse current may be caused by a body diode effect of the second transistor MT2 even though the level of the second driving signal DR2 is lower than a threshold voltage of the second transistor MT2. Using the reverse current, the zero voltage switching may be performed such that the first transistor MT1 is turned on after the drain-source voltage Vds becomes zero.

As such, a voltage converter according to example embodiments may reduce switching loss and conduction loss by replacing an output diode with an output transistor, that is, the second transistor MT2 and by driving the output transistor using a signal synchronized through the magnetic coupling, that is, the second driving signal DR2. In addition, the voltage converter according to example embodiments may reduce electromagnetic interference through the zero voltage switching and may control the driving signal DR2 of the output transistor MT2 efficiently by adjusting the inductance of the driving inductor Lg.

Figure 5:
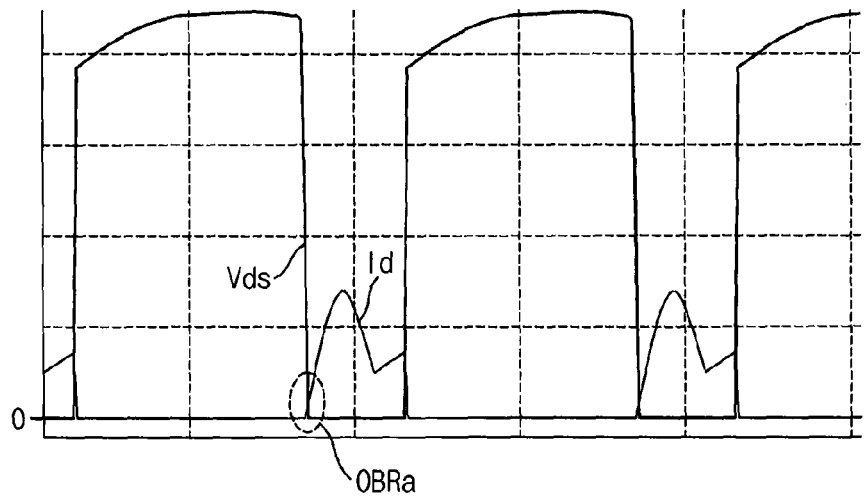
FIGS. 5 and 6 are diagrams for describing switching low in case of adopting an output diode.
Figure 6:
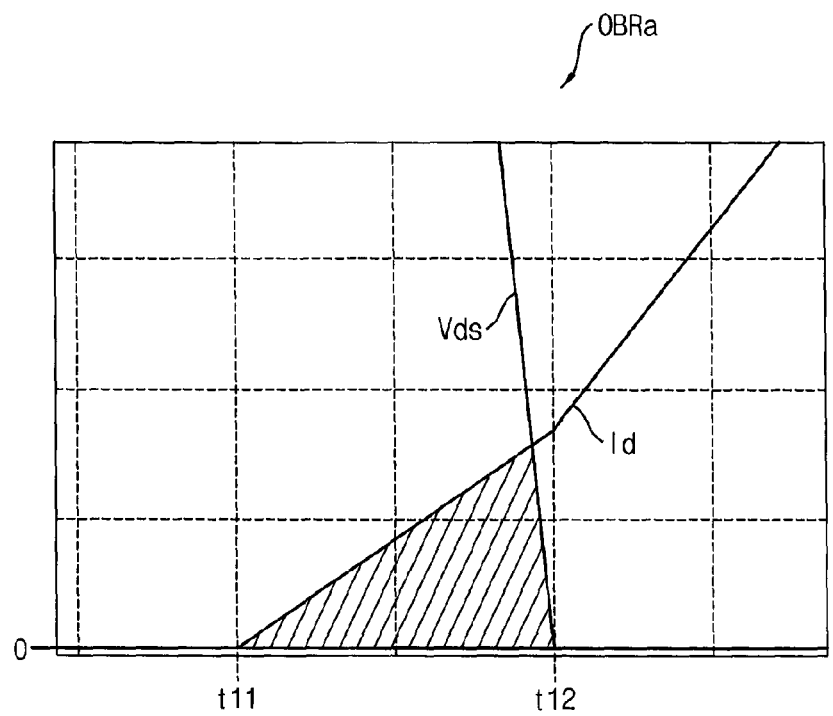

FIGS. 5 and 6 are diagrams for describing switching low in case of adopting an output diode.

FIGS. 5 and 6 illustrate the drain-source voltage Vds and the drain current Id of the first transistor MT1 in case that the second transistor MT2 in the voltage converter 11 of FIG. 2 is replaced with an output diode. FIG. 6 is an enlarged diagram of a boundary region OBRa in FIG. 5 when the first transistor MT1 is turned on.

During the time interval between t11 and t12 in FIG. 6, the drain current Id is generated before the drain-source voltage Vds drops to a zero voltage. The loss of such hard switching corresponds to the hashed area in FIG. 6.

Figure 7:
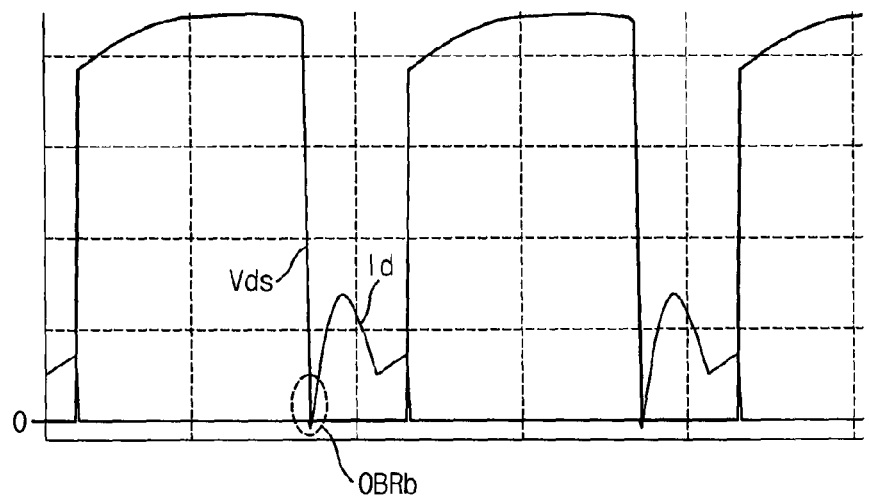
FIGS. 7 and 8 are diagrams for describing zero voltage switching that is performed according to example embodiment.
Figure 8:
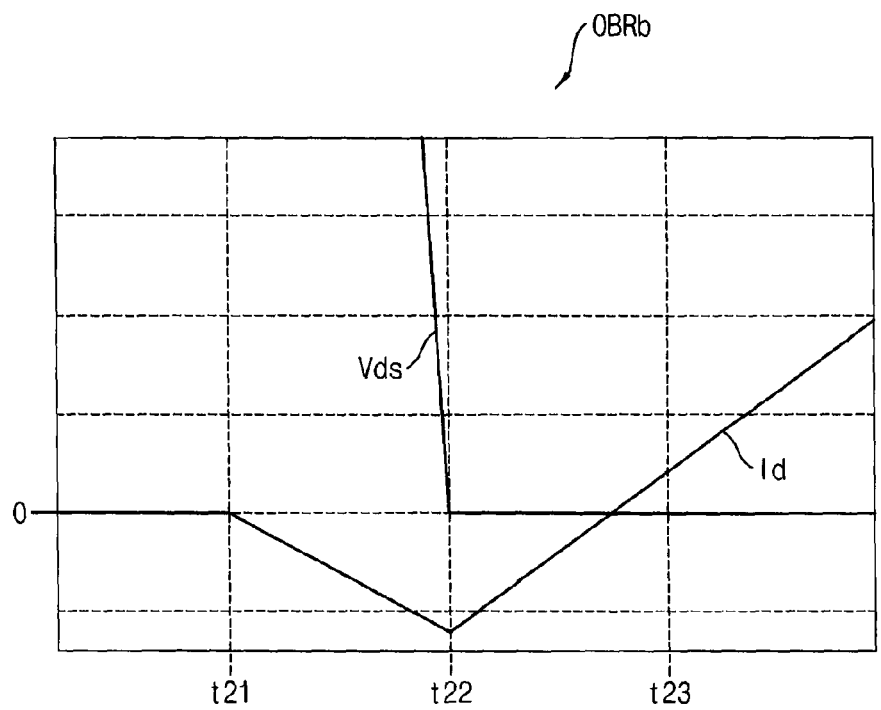

FIGS. 7 and 8 are diagrams for describing zero voltage switching that is performed according to an example embodiment.

FIGS. 7 and 8 illustrate the drain-source voltage Vds and the drain current Id of the first transistor MT1 in case that the second transistor MT2 replaces a conventional output diode. FIG. 8 is an enlarged diagram of a boundary region OBRb in FIG. 7 when the first transistor MT1 is turned on.

During the time interval between t21 and t23 in FIG. 8, the drain current Id has a negative level due to the reverse current from the output node No to the second N2. As described with reference to FIG. 4, during the time interval between t21 and t22, the level of the second driving signal DR2 is higher than a threshold voltage of the second transistor MT2 and thus the reverse current flowing from the output node No to the second node N2 may be caused. During the time interval between t22 and t23, the reverse current may be caused by a body diode effect of the second transistor MT2 even though the level of the second driving signal DR2 is lower than a threshold voltage of the second transistor MT2. Using the reverse current, the zero voltage switching may be performed such that the first transistor MT1 is turned on after the drain-source voltage Vds becomes zero.

The conduction loss may be reduced by replacing a conventional output diode with an output transistor, that is, the second transistor MT2. The conduction loss may be very severe if a rectifying diode is used in a high-current device. For example, power of 2 W may be consumed when a forward voltage of the diode is 1V and a diode current is 1 A. In case of a high-voltage MOS transistor having a turn-on resistance of 0.5 ohm, a heat loss of 0.5 W may be caused if the turn-on current is 1 A. As such, the conduction loss may be reduced by replacing the output diode with the output transistor.

FIGS. 9, 10, 11 and 12 are circuit diagrams illustrating voltage converters according to example embodiments. Hereinafter, configurations of voltage converters are described and description of operations of the voltage converter as described with reference to FIGS. 2 and 4 may be omitted.

Figure 9:
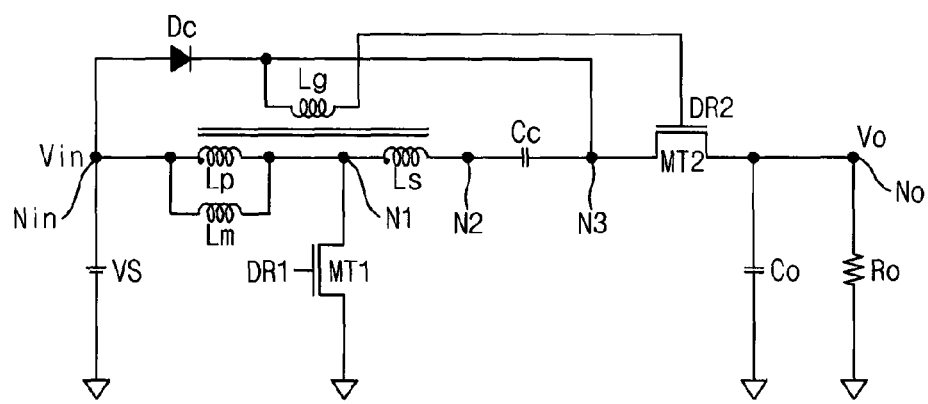

Referring to FIG. 9, a voltage converter 12 may include a primary inductor Lp, a secondary inductor Ls, a first transistor MT1, a driving inductor Lg, a coupling capacitor Cc, a clamp diode Dc, a second transistor MT2 and an output capacitor Co. A voltage source VS and a load Ro are illustrated further in FIG. 2 for convenience of description.

The primary inductor Lp, the secondary inductor Ls, the coupling capacitor Cc, the clamp diode Dc and the first transistor MT1 correspond to the conversion unit 20 of FIG. 1. The primary inductor Lp is connected between an input node Nin receiving an input voltage Vin and a first node N1. The secondary inductor Ls is connected between the first node N1 and a second node N2. The first transistor MT1 is connected between the first node N1 and a ground voltage, and a gate electrode of the first transistor MT1 receives the first driving signal DR1. The coupling capacitor Cc is connected between the second node N2 and a third node N3 providing the boosting power BP. An anode of the clamp diode Dc is connected to the input node Nin and a cathode of the clamp diode Dc is connected to the third node N3.

The first transistor MT1 is switched in response to the first driving signal DR1 that may be provided from an external driver to control current flows of the conversion unit 20. The primary inductor Lp and the secondary inductor Ls form a magnetic coupling according to a mutual inductance between them. Also the primary inductor Lp and the secondary inductor Ls are electrically connected through the first node N1. A magnetization inductance component Lm in parallel with the primary inductor Lp is represented in FIG. 9. Even though not illustrated in FIG. 9, also a leakage inductance component may be formed in series with the primary inductor Lp toward the direction of the input voltage Vin. The coupling capacitor Cc forms a capacitive coupling between the second nod N2 and the third node N3. The clamp diode Dc limits a voltage on the third node N3 to a predetermined voltage level.

The driving inductor Lg corresponds to the self driver 30 of FIG. 1. The driving inductor Lg forms a magnetic coupling with at least one of the primary inductor Lp and the secondary inductor Ls to generate a second driving signal DR2 that is synchronized with the first driving signal DR1. In some example embodiments, the driving inductor Lg may be connected to the cathode of the clamp diode Dc as illustrated in FIG. 9.

The second transistor MT2 and the output capacitor Co correspond to the output unit 40 of FIG. 1. The second transistor MT2 is connected between the third node N3 and an output node No providing an output voltage Vo. A gate electrode of the second transistor MT2 receives the second driving signal DR2. The output capacitor Co is connected between the output node No and the ground voltage.

Figure 10:
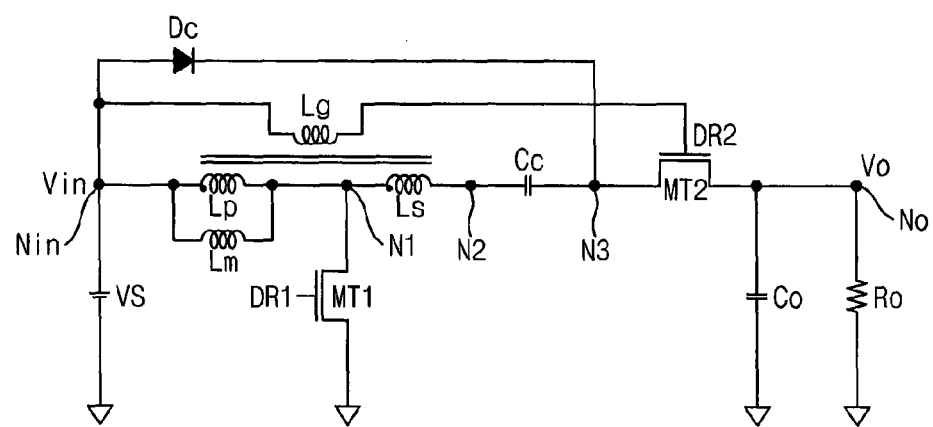

Referring to FIG. 10, a voltage converter 13 may include a primary inductor Lp, a secondary inductor Ls, a first transistor MT1, a driving inductor Lg, a coupling capacitor Cc, a clamp diode Dc, a second transistor MT2 and an output capacitor Co. A voltage source VS and a load Ro are illustrated further in FIG. 2 for convenience of description.

The primary inductor Lp, the secondary inductor Ls, the coupling capacitor Cc, the clamp diode Dc and the first transistor MT1 correspond to the conversion unit 20 of FIG. 1. The primary inductor Lp is connected between an input node Nin receiving an input voltage Vin and a first node N1. The secondary inductor Ls is connected between the first node N1 and a second node N2. The first transistor MT1 is connected between the first node N1 and a ground voltage, and a gate electrode of the first transistor MT1 receives the first driving signal DR1. The coupling capacitor Cc is connected between the second node N2 and a third node N3 providing the boosting power BP. An anode of the claim diode Dc is connected to the input node Nin and a cathode of the clamp diode Dc is connected to the third node N3.

The first transistor MT1 is switched in response to the first driving signal DR1 that may be provided from an external driver to control current flows of the conversion unit 20. The primary inductor Lp and the secondary inductor Ls form a magnetic coupling according to a mutual inductance between them. Also the primary inductor Lp and the secondary inductor Ls are electrically connected through the first node N1. A magnetization inductance component Lm in parallel with the primary inductor Lp is represented in FIG. 9. Even though not illustrated in FIG. 9, also a leakage inductance component may be formed in series with the primary inductor Lp toward the direction of the input voltage Vin. The coupling capacitor Cc forms a capacitive coupling between the second node N2 and the third node N3. The clamp diode Dc limits a voltage on the third node N3 to a predetermined voltage level.

The driving inductor Lg corresponds to the self driver 30 of FIG. 1. The driving inductor Lg forms a magnetic coupling with at least one of the primary inductor Lp and the secondary inductor Ls to generate a second driving signal DR2 that is synchronized with the first driving signal DR1. In some example embodiments, the driving inductor Lg may be connected to the anode of the clamp diode Dc as illustrated in FIG. 10.

The second transistor MT2 and the output capacitor Co correspond to the output unit 40 of FIG. 1. The second transistor MT2 is connected between the third node N3 and an output node No providing an output voltage Vo. A gate electrode of the second transistor MT2 receives the second driving signal DR2. The output capacitor Co is connected between the output node No and the ground voltage.

Referring to FIG. 11, a voltage converter 14 may include a primary inductor Lp, a secondary inductor Ls, a first transistor MT1, a driving inductor Lg, a coupling capacitor Cc, a clamp diode Dc, a second transistor MT2 and an output capacitor Co. Compared with the voltage converter 13 of FIG. 10, the anode of the clamp diode Dc is connected to the first node N1 and the cathode of the clamp diode Dc is connected to the third node N3 in the voltage converter 14 of FIG. 11.

Referring to FIG. 12, a voltage converter 15 may include a primary inductor Lp, a secondary inductor Ls, a first transistor MT1, a driving inductor Lg, a coupling capacitor Cc, a clamp diode Dc, a second transistor MT2 and an output capacitor Co. Compared with the voltage converter 13 of FIG. 10, the anode of the clamp diode Dc is connected to the ground voltage and the cathode of the clamp diode Dc is connected to the third node N3 in the voltage converter 15 of FIG. 12.

Figure 13:
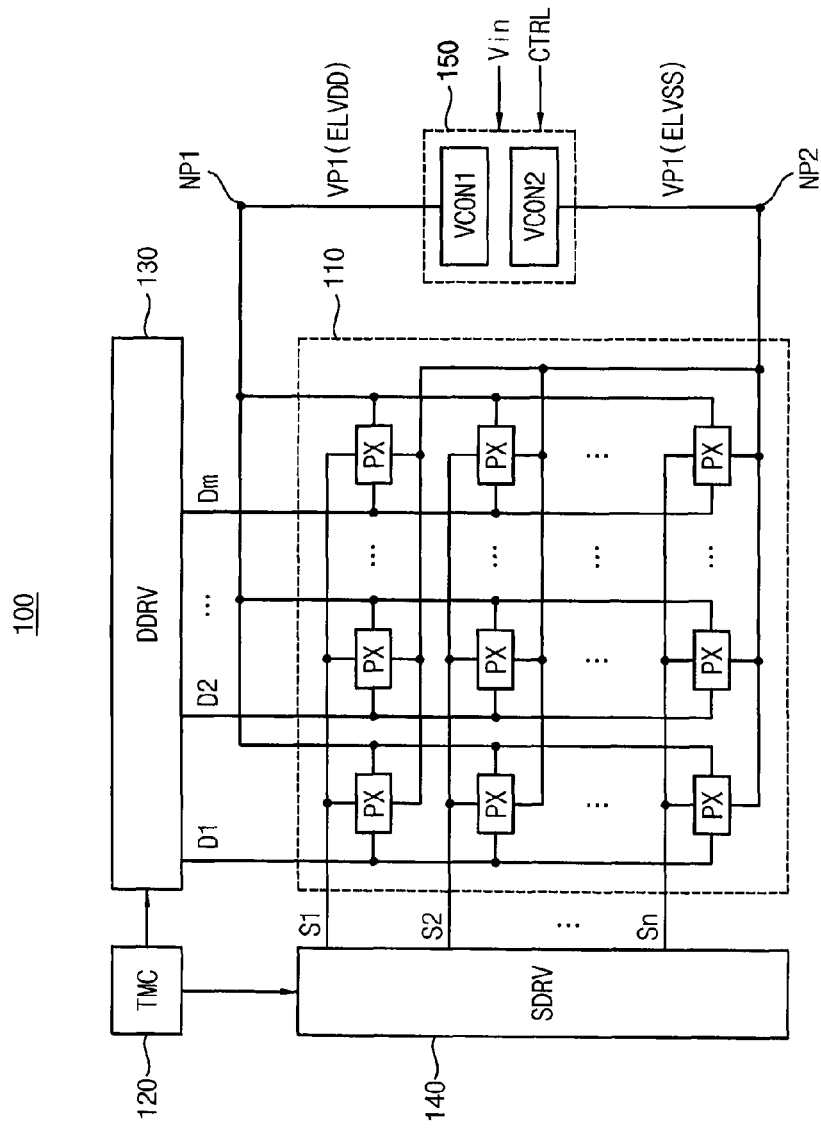
FIG. 13 is a block diagram illustrating an electroluminescent display device according to example embodiments.

FIG. 13 is a block diagram illustrating an electroluminescent display device according to example embodiments.

Referring to FIG. 13, an electroluminescent display device 100 includes a display panel 110, a timing controller (TMC) 120, a data driver (DDRV) 130, a scan driver (SDRV) 140 and a power supply circuit 150. Even though not illustrated in FIG. 13, the electroluminescent display 100 may further include a buffer for storing image data to be displayed, etc.

The display panel 110 includes a plurality of pixels PX or pixel circuits disposed in rows and columns. For example, the pixels PX may be arranged in a matrix form of n rows and m columns as illustrated in FIG. 13. The display panel is connected to the data driver 130 through data lines D1~Dm, and to the scan driver 140 through scan lines S1~Sn. The display panel 110 is connected between a first power node NP1 and a second power node NP2 to be powered by the power supply circuit 150.

The power supply circuit 150 may operate based on control signals CTRL, and at least a portion of the control signals CTRL may be provided from the timing controller 120 or a signal generator that is controlled by the timing controller 120.

As illustrated in FIG. 13, the power supply circuit 150 may include a first voltage converter VCON1 and a second voltage converter VCON2. An input voltage Vin provided to the power supply circuit 150 may be a DC voltage such as a battery voltage, and the first and second voltage converters VCON1 and VCON2 may be DC-DC converters. The first voltage VCON1 converter may be referred to as a boost converter and the second voltage converter VCON2 may be referred to as an inverting buck-boost converter.

The first voltage converter VCON1 generates a first power supply voltage ELVDD having a positive voltage level based on the input voltage Vin to drive the first power node NP1 with the first power supply voltage ELVDD. A voltage VP1 on the first power node NP1 may be substantially the same as the first power supply voltage ELVDD. The second voltage converter VCON2 generates a second power supply voltage ELVSS having a negative voltage level based on the input voltage Vin to drive the second power node NP2 with the second power supply voltage ELVSS.

The first voltage converter VCON1 may include a conversion unit, a self driver and an output unit as described with reference to FIGS. 1 through 12. The conversion unit includes at least one inductor and provides a boosting power based on an input voltage Vin and a first driving signal. The first driving signal may be included in the controls signal CTRL. The self driver includes at least one inductor that forms a magnetic coupling with the at least one inductor of the conversion unit. The self driver generates a second driving signal that is synchronized with the first driving signal through the magnetic coupling. The output unit generates the first power supply voltage ELVDD based on the boosting power and the second driving signal.

The data driver 130 may provide data signals to the display panel 110 through the data lines D1~Dm. The scan driver 140 may provide row control signals to the display panel 110 through the scan lines S1~Sn. The pixels PX may be located where the data lines D1~Dm and the scan lines S1~Sn cross.

The timing controller 120 may control overall operations of the electroluminescent display 100. The timing controller 120 can provide control signals to control the display unit 110, the data driver 130, the scan driver 140 and the power supply circuit 150. In some embodiments, the timing controller 120, the data driver 130, the scan driver 140 and the power supply circuit 150 may be implemented as a single integrated circuit (IC). In other embodiments, the timing controller 120, the data driver 130, the scan driver 140 and the power supply circuit 150 may be implemented as two or more ICs.

Figure 14:
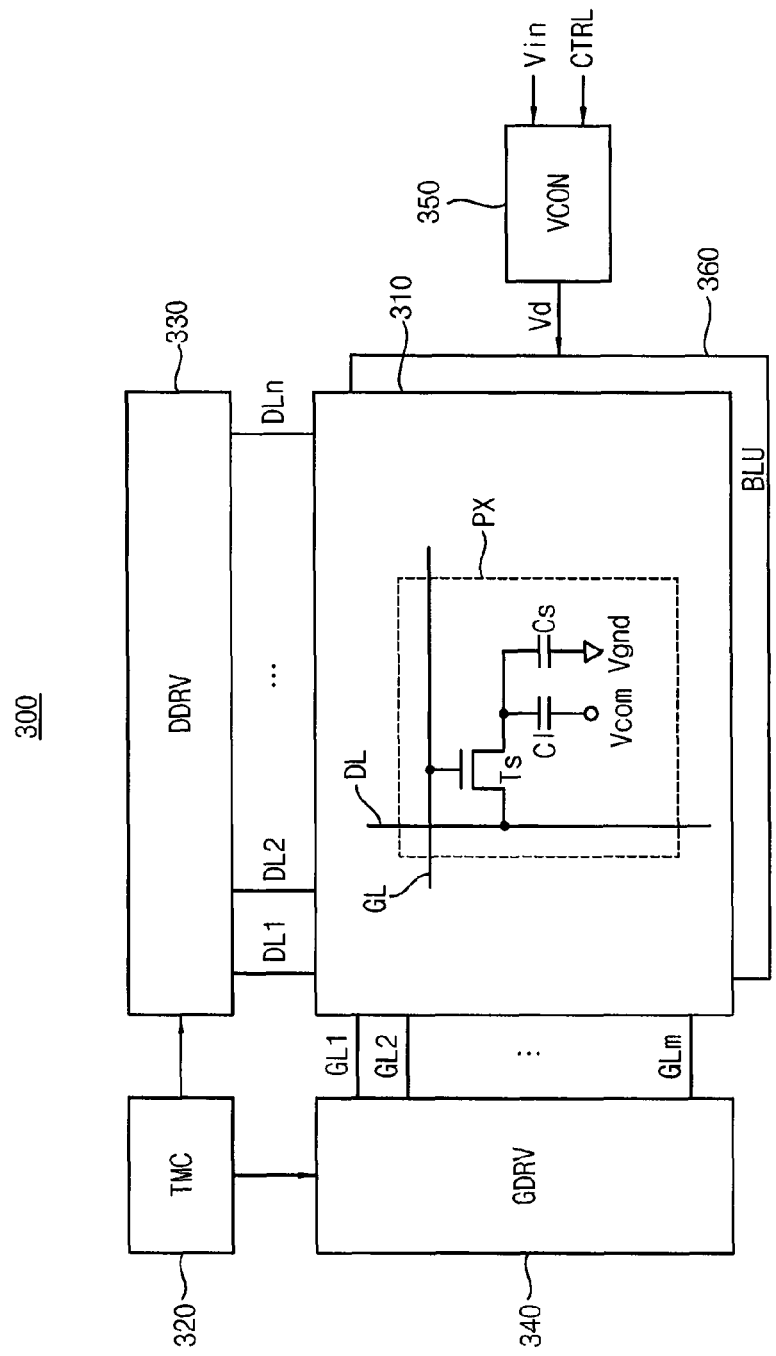
FIG. 14 is a block diagram illustrating a liquid crystal display device according to example embodiments.

FIG. 14 is a block diagram illustrating a liquid crystal display device according to example embodiments.

Referring to FIG. 14, a liquid crystal display device 300 includes a display panel 310, a timing controller (TMC) 320, a data driver (DDRV) 330, and a gate driver (GDRV) 340, a voltage converter 350 and a back light unit (BLU) 360. Even though not illustrated in FIG. 14, the liquid crystal display device 300 may further include a buffer for storing image data to be displayed, etc.

The display panel 310 includes a plurality of pixels PX coupled to a plurality of data lines DL1~DLn and a plurality of gate lines GL1~GLm, respectively. As illustrated in FIG. 14, each pixel PX may include a switching element Ts, a liquid crystal capacitor Cl and a storage capacitor Cs. The switching element Ts connects the capacitors Cl and Cs to the corresponding data line DLi in response to a gate driving signal transferred through the corresponding gate line GLi. The liquid crystal capacitor Cl is connected between the switching element and the common voltage Vcom, and the storage capacitor Cs is connected between the switching element and the ground voltage Vgnd.

For example, the pixels PX may be arranged in a matrix form of m rows and n columns. The pixels PX in the display panel 310 are connected to the data driver 330 through the data lines DL1~DLn and to the gate driver 340 through the gate lines GL1~GLm.

The data driver 330 may provide data signals, that is, data voltages to the display panel 310 through the data lines DL1~DLn. The gate driver 340 provides gate driving signals through the gate lines GL1~GLm for controlling the pixels PX by units of rows. The timing controller 320 controls overall operations of the liquid crystal display device 300. The timing controller 320 may provide control signals CTRL to control the display panel 310, the data driver 330, the gate driver 340, etc. In at least one exemplary embodiment, the timing controller 320, the data driver 330 and the gate driver 340 may be implemented as a single integrated circuit (IC). In at least one exemplary embodiment, the timing controller 320, the data driver 330 and the gate driver 340 may be implemented as two or more ICs.

The voltage converter 350 may operate based on control signals CTRL, and at least a portion of the control signals CTRL may be provided from the timing controller 320 or a signal generator that is controlled by the timing controller 320.

The first voltage converter 350 may include a conversion unit, a self driver and an output unit as described with reference to FIGS. 1 through 12. The conversion unit includes at least one inductor and provides a boosting power based on an input voltage Vin and a first driving signal. The first driving signal may be included in the controls signal CTRL. The self driver includes at least one inductor that forms a magnetic coupling with the at least one inductor of the conversion unit. The self driver generates a second driving signal that is synchronized with the first driving signal through the magnetic coupling. The output unit generates an output voltage Vd based on the boosting power and the second driving signal.

The output voltage Vd from the voltage converter 350 is provided to the back light unit 360, and the back light unit 360 emits lights to the display panel 310 based on the output voltage Vd. For example, the back light unit 360 may include a plurality of electroluminescent diodes and other optical elements for enhancing luminance of the lights from the back light unit 360.

Figure 15:
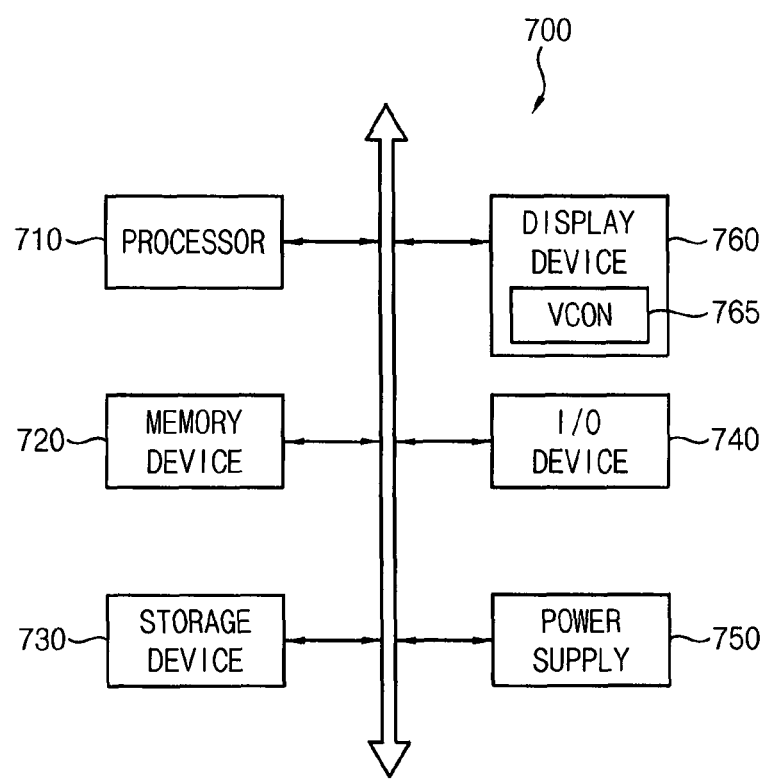
FIG. 15 is a block diagram illustrating a mobile device according to example embodiments.

FIG. 15 is a block diagram illustrating a mobile device according to example embodiments.

Referring to FIG. 14, a mobile device 700 includes a processor 710, a memory device 720, a storage device 730, an input/output (I/O) device 740, a power supply 750, and a display device 760. The mobile device 700 may further include a plurality of ports for communicating with a video card, a sound card, a memory card, a universal serial bus (USB) device, or other electronic systems.

The processor 710 may perform various computing functions or tasks. The processor 710 may be for example, a microprocessor, a central processing unit (CPU), etc. The processor 710 may be connected to other components via an address bus, a control bus, a data bus, etc. Further, the processor 710 may be coupled to an extended bus such as a peripheral component interconnection (PCI) bus.

The memory device 720 may store data for operations of the mobile device 700. For example, the memory device 720 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano-floating gate memory (NFGM) device, a polymer random access memory (PoRAM) device, a magnetic random access memory (MRAM) device, a ferroelectric random access memory (FRAM) device, and/or at least one volatile memory device such as a dynamic random access memory (DRAM) device, a static random access memory (SRAM) device, a mobile dynamic random access memory (mobile DRAM) device, etc.

The storage device 730 may be, for example, a solid state drive (SSD) device, a hard disk drive (HDD) device, a CD-ROM device, etc. The I/O device 740 may be, for example, an input device such as a keyboard, a keypad, a mouse, a touch screen, and/or an output device such as a printer, a speaker, etc. The power supply 750 may supply power for operating the mobile device 700. The display device 760 may communicate with other components via the buses or other communication links.

The display device 760 may include a voltage converter (VCON) 765. In other example embodiments, the voltage converter 765 may be included in the power supply 750.

The voltage converter 765 may include a conversion unit, a self driver and an output unit as described with reference to FIGS. 1 through 12. The conversion unit includes at least one inductor and provides a boosting power based on an input voltage Vin and a first driving signal. The self driver includes at least one inductor that forms a magnetic coupling with the at least one inductor of the conversion unit. The self driver generates a second driving signal that is synchronized with the first driving signal through the magnetic coupling. The output unit generates an output voltage based on the boosting power and the second driving signal.

The present embodiments may be applied to any mobile device or any computing device. For example, the present embodiments may be applied to a cellular phone, a smart phone, a tablet computer, a personal digital assistant (PDA), a portable multimedia player (PMP), a digital camera, a music player, a portable game console, a navigation system, a video phone, a personal computer (PC), a server computer, a workstation, a tablet computer, a laptop computer, etc.

As described above, a voltage converter and a display device including the display device according to example embodiment may reduce switching loss and conduction loss by replacing an output diode with an output transistor, that is, the second transistor MT2 and by driving the output transistor using a signal synchronized through the magnetic coupling, that is, the second driving signal DR2. Further, the voltage converter and the display device according to example embodiments may reduce voltage spike and electromagnetic interference through zero voltage switching and may control the driving signal of the output transistor efficiently by adjusting the inductance of the driving inductor.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A voltage converter comprising:
   a conversion unit including at least one inductor, the conversion unit configured to provide a boosting power based on an input voltage and a first driving signal;
   a self driver including at least one inductor that forms a magnetic coupling with the at least one inductor of the conversion unit, the self driver configured to generate a second driving signal that is synchronized with the first driving signal through the magnetic coupling; and
   an output unit configured to generate an output voltage based on the boosting power and the second driving signal,
   wherein the at least one inductor of the conversion unit is directly connected to an input node receiving the input voltage, and the at least one inductor of the self driver is directly connected to the input node.

2. The voltage converter of claim 1, wherein the conversion unit includes:
   a primary inductor connected between the input node and a first node;
   a secondary inductor connected between the first node and a second node providing the boosting power; and
   a first transistor connected between the first node and a ground voltage, a gate electrode of the first transistor receiving the first driving signal.

3. The voltage converter of claim 2, wherein the self driver includes;
   a driving inductor forming the magnetic coupling with at least one of the primary inductor and the secondary inductor to generate the second driving signal that is synchronized with the first driving signal.

4. The voltage converter of claim 3, wherein the driving inductor includes a variable inductor to control transition timings of the second driving signal by adjusting an inductance of the variable inductor.

5. The voltage converter of claim 3, wherein the driving inductor is electrically coupled to the input node.

6. The voltage converter of claim 2, wherein the output unit includes:
   a second transistor connected between the second node and an output node providing the output voltage, a gate electrode of the second transistor receiving the second driving signal.

7. The voltage converter of claim 6, wherein the output unit further includes:
   an output capacitor connected between the output node and the ground voltage.

8. The voltage converter of claim 1, wherein the conversion unit includes:
   a primary inductor connected between the input node and a first node;
   a secondary inductor connected between the first node and a second node;
   a first transistor connected between the first node and a ground voltage, a gate electrode of the first transistor receiving the first driving signal;
   a coupling capacitor connected between the second node and a third node providing the boosting power; and
   a clamp diode connected to the third node.

9. The voltage converter of claim 8, wherein an anode of the clamp diode is connected to the input node and a cathode of the clamp diode is connected to the third node.

10. The voltage converter of claim 9, wherein the self driver includes:
    a driving inductor forming the magnetic coupling with at least one of the primary inductor and the secondary inductor to generate the second driving signal that is synchronized with the first driving signal, the driving inductor connected to the cathode of the clamp diode.

11. The voltage converter of claim 8, wherein an anode of the clamp diode is connected to the first node and a cathode of the clamp diode is connected to the third node.

12. The voltage converter of claim 8, wherein an anode of the clamp diode is connected to the ground voltage and a cathode of the clamp diode is connected to the third node.

13. The voltage converter of claim 8, wherein the output unit includes:
    a second transistor connected between the third node and an output node providing the output voltage, a gate electrode of the second transistor receiving the second driving signal; and
    an output capacitor connected between the output node and the ground voltage.

14. The voltage converter of claim 1, wherein the input voltage and the output voltage are DC voltages.

15. A voltage converter comprising:
    a primary inductor connected between an input node receiving an input voltage and a first node;

a secondary inductor connected between the first node and a second node;

a first transistor connected between the first node and a ground voltage, a gate electrode of the first transistor receiving the first driving signal;

a driving inductor forming a magnetic coupling with at least one of the primary inductor and the secondary inductor to generate a second driving signal that is synchronized with the first driving signal;

a second transistor connected between the second node and an output node providing an output voltage, a gate electrode of the second transistor receiving the second driving signal; and an output capacitor connected between the output node and the ground voltage, wherein the primary inductor is directly connected to the input node, and the driving inductor is directly connected to the input node.

16. The voltage converter of claim 15, wherein the second transistor is turned on before the first transistor is turned on to generate a reverse current flowing from the output node to the second node.

17. The voltage converter of claim 15, wherein a zero voltage switching is performed such that the first transistor is turned on after a voltage on the first node becomes a zero voltage.

18. A display device comprising:
a display panel including a plurality of pixels forming a plurality of row and a plurality of columns;
a driver configured to drive the pixels in the display panel; and
a voltage converter configured to boost an input voltage to provide an output voltage, the voltage converter comprising:
 a conversion unit including at least one inductor, the conversion unit configured to provide a boosting power based on the input voltage and a first driving signal;
 a self driver including at least one inductor that forms a magnetic coupling with the at least one inductor of the conversion unit, the self driver configured to generate a second driving signal that is synchronized with the first driving signal through the magnetic coupling; and
 an output unit configured to generate the output voltage based on the boosting power and the second driving signal,
wherein the at least one inductor of the conversion unit is directly connected to an input node receiving the input voltage, and the at least one inductor of the self driver is directly connected to the input node.

19. The display device of claim 18, wherein the output voltage generated by the voltage converter is provided to the display panel.

20. The display device of claim 18, further comprising:
a back light unit configured to emit lights to the display panel,
wherein the output voltage generated by the voltage converter is provided to the back light unit.

* * * * *